United States Patent [19]

Cenegy

[11] Patent Number: 4,559,239

[45] Date of Patent: Dec. 17, 1985

[54] METHOD FOR REPAIRING CEMENTITIOUS SUBSTRATE

[76] Inventor: Louis F. Cenegy, 25411 Teton Way, El Toro, Calif. 92630

[21] Appl. No.: 562,161

[22] Filed: Dec. 16, 1983

Related U.S. Application Data

[63] Continuation-in-part of Ser. No. 505,232, Jun. 17, 1983, which is a continuation-in-part of Ser. No. 344,504, Feb. 1, 1982, Pat. No. 4,507,336.

[51] Int. Cl.$^4$ .......................... B32B 35/00; B05D 1/02
[52] U.S. Cl. ...................................... 427/140; 138/97; 427/422; 427/426
[58] Field of Search ............... 427/422, 426, 236, 140; 528/44, 78; 138/97

[56] References Cited

U.S. PATENT DOCUMENTS

| | | | |
|---|---|---|---|
| 3,091,551 | 5/1963 | Robertson | 427/426 |
| 3,440,086 | 4/1969 | Kerns | 427/426 X |
| 3,493,257 | 2/1970 | Fitzgerald et al. | 428/319.3 X |
| 3,649,324 | 3/1972 | Payne | 427/244 X |
| 3,772,113 | 11/1973 | Patrick | 427/140 X |
| 3,856,614 | 12/1974 | Susuki et al. | 428/318.6 X |
| 3,873,407 | 3/1975 | Kumata et al. | 428/318.6 X |
| 3,967,028 | 6/1976 | Müller et al. | 427/244 X |
| 4,389,454 | 6/1983 | Horacek et al. | 528/44 X |

*Primary Examiner*—Evan K. Lawrence

[57] ABSTRACT

A method of repairing cementitious substrates with polyurethane in which volatile-free polyurethane precursor reactants are sprayed and polymerized on the surfaces of cementitious articles, such as concrete water conduits.

3 Claims, No Drawings

METHOD FOR REPAIRING CEMENTITIOUS SUBSTRATE

CROSS REFERENCE TO OTHER APPLICATIONS

This is a continuation-in-part of pending application Ser. No. 505,232, filed June 17, 1983, which is a continuation-in-part of application Ser. No. 344,504, filed Feb. 1, 1982, U.S. Pat. No. 4,507,336.

BACKGROUND OF THE INVENTION

This invention relates to a method for protecting or repairing cementitious substrates such as those made of Portland cement.

Cementitious compositions are widely used in numerous fields. Particularly important compositions include conventional concrete blends which employ Portland cement, a fine aggregate (such as sand), and a coarse aggregate of stone. These materials are used not only to make conventional building structural components, such as beams, columns, walls, and floors, which may be protected from the weather, but also such exposed components as roofs, sills, and foundations. Concrete compositions are also commonly used to make tunnels, tanks, and conduits which may be subjected to virtually constant contact with standing or moving water, or other agents.

Because of its overall characteristics and its economy of use, concrete is a highly preferred construction material; however, it has certain disadvantages. For example, water contact will gradually attack and erode away the interstitial bonding ingredients of the Portland cement, leaving loose aggregate, and thus weakening the structure. The concrete is especially subject to attack by liquids containing acidic components, and thus water that contains acid impurities, such as may be found in sewage drainage conduits or drainage pipes from acid-containing soil, causes accelerated erosion of the concrete structure.

Erosion of the bonding element of the concrete may extend a considerable depth from the outer surface. Thus, the weakness of the concrete structure may be disguised by its external appearance; yet, the weakened structure may virtually crumble or disintegrate under its own weight or from even slight external agitation.

The foregoing deficiencies of the prior art can be eliminated or greatly alleviated in accordance with the present invention.

SUMMARY OF THE INVENTION

The invention contemplates the repair or protection of cementitious structures by spraying a partially weakened or eroded cementitious substrate with certain substantially volatile-free polyurethane reactants. The coating is spraying onto the substrate to a thickness in the range from about 10 mils to about 100 mils, forming a unitary, composite structure therewith.

An essential feature of the invention is to use substantially volatile-free precursor reactants to form the polyurethane layer. The reactants are mixed or blended using spray techniques, such as by conventional spray guns of the same types used for spraying multicomponent polyurethane reactants that have volatile liquid carriers or diluents. By eliminating the nonreactive volatile carriers or diluents, this process may employ essentially 100% reactive ingredients, so that the reactants can mix, polymerize, and harden without the necessity of evaporating or otherwise removing the carrier or diluent liquid.

The polyurethane precursor reactants consist essentially of precisely controlled proportions of conventional polyols, amines, and isocyanates.

Generally, the polyols suitable for use in the invention include urethane precursor diols or triols, or mixtures thereof, having average molecular weights in the range from about 1,000 to about 6,000. Typically, the polyols constitute about 5 wt.% to about 45 wt.% of the process reactants. The preferred polyols are conventional polyether polyols, formed by reacting ethylene oxide or propylene oxide with trimethylolpropane, pentaerythritol glycerol, and aliphatic or aromatic amines, or the like.

Urethane precursor amines are also used in amounts ranging from about 5 wt.% to about 45 wt.% of process reactants, and preferably the amines have average hydroxyl numbers in the range from about 300 to about 900. A particularly preferred amine is N,N,N',N'-tetrakis (2-hydroxypropyl) ethylene-diamine.

Conventional isocyanate precursors of urethanes can be used; however, in the particularly preferred embodiments of the invention, diphenylmethane 4,4 diisocyanate is used in quantities sufficient to react with the polyol and amine reactants.

After the reactants are sprayed onto the cementitious substrate component, they complete the reaction very rapidly and are cured typically in less than five minutes. The resultant tough elastomeric coating provides sufficient protection for the underlying substrate to render it moisture-proof and eliminate erosion, even when it is contacted with low pH liquids for long periods.

DETAILED DESCRIPTION OF THE INVENTION

An example of the use of the method and compositions of this invention is found in the protection of concrete water conduits, such as large irrigation canals or large diameter concrete pipe. The polyurethane reactants may be sprayed onto relatively new concrete conduits before they have undergone substantial deterioration. However, special surprising advantages of the invention are particularly apparent when the polyurethane is applied to concrete which has reached a substantially deteriorated condition. For example, in a large open conduit in which the integrity of the structure has been weakened by cracking, quick and long-lasting repairs can be made. Similarly, when the surface of a particular conduit has been attacked to the point where much of the bonding cementitious material has been eroded away, there may be a considerable amount of void space between aggregates. Moreover, particular particles or granules of aggregate material may be held by an adhesive connection between only one side or point and the rest of the structure. Even mild agitation will break such aggregate material loose and cause it to fall away from the structure entirely, or to slide to a different position among the other aggregate components, leaving a void space behind. The objective of the method herein is to fix the aggregate particles in a stable configuration, fill the void spaces around them, and prevent new voids from forming. This is achieved by spraying certain polyurethane precursor reactants onto the surface of the cementitious substrate and permitting the reactants to migrate into the voids and interstices of the structure, after which the reactants complete the reaction to form a tough, solid polyurethane matrix for the interspersed aggregate.

It is important to use polyurethane precursor reactants which can be mixed and sprayed through conventional spray guns, so that the operator can quickly and efficiently apply a layer of the reactants to the conduit. The mixed reactants should have a sufficiently low viscosity to permit them to saturate the void spaces, and yet be sufficiently viscous to permit them to be sprayed onto vertical or even overhead surfaces without undue running or dripping. Similarly, it is important that the reactants polymerize quickly to form the toughened matrix. Also, the presence of any volatile constituents must be avoided, since these will tend to slow down the polymerization, or, alternatively, they will be entrapped and produce a weakened or porous polyurethane matrix.

A particularly preferred combination of precursor components can be prepared as follows:

| "A" Component | | "B" Component | |
|---|---|---|---|
| wt. % | Ingredient | wt. % | Ingredient |
| 43.0 | diphenylmethane 4,4, diisocyanate | 27.6 | ethylene oxide capped 3,500 mol. wt. triol, having a hydroxyl number of about 35 |
| 7.0 | chlorinated paraffin nonvolatile diluent | | |
| | | 22.0 | N,N,N',N' tetrakis (2-hydroxypropyl) ethylenediamine having a hydroxyl number of about 800 |
| | | 0.4 | dibutyltindilaurate catalyst |

The A and B components are mixed and sprayed using a standard Gusmer type spray gun with nozzle pressures for each component of at least about 300 psi. The A component is preheated by conventional means to 100° F. and the B component is preheated to 140° F. Other guns may also be successfully employed, including conventional Binks and Glascraft models. The precise component preheat temperatures may also be varied, depending on the desired results. Thus, the A component may range from ambient temperature to about 140° F., while the B component ranges from about 110° F. to about 150° F., preferably from about 130° F. to about 140° F. In general, high preheat temperatures are desired for fast reactions, while lower temperatures are used to slow down the reactions, as for fine detail work.

The sprayed reactants, having no volatile components, form a tough elastomeric layer in a gel time of less than about 12 seconds. Typically, the above compositions have gel times of less than about three seconds, usually approximately two to three seconds. The resulting polyurethane matrix material has a density of approximately 50 to 65 lbs. per cubic foot and has excellent physical properties and superior abrasion and impact resistance. It can be built up to any desired thickness to achieve additional structural integrity. Typical analysis of physical properties of urethane coatings of the foregoing composition are as follows:

| | |
|---|---|
| Tensile Strength: | 3,350 psi |
| Elongation: | 8% |
| Compressive Strength (to failure): | 11,250 psi |
| Flexural Modulus: | 210,000 |

Because of the rapid reaction rates and short gel times, it is possible, in accordance with alternative embodiments of the present invention, to spray the urethane coating onto vertical or even overhead cementitious substrates, as well as on curved surfaces, such as the interior of large concrete pipes. The polymerization rate can be accelerated and controlled using any conventional urethane catalyst, especially organometallic, preferably organotin, components. Conventional surfactant and fire retardants may also be used in the compositions.

The isocyanates which are suitable for use in accordance with the present invention include conventional urethane precursors, such as MDI and prepolymers based on MDI; however, in particularly preferred embodiments it is desired to use diphenylmethane 4,4 diisocyanate having a functionality in the range from about 2.0 to about 2.8. By using diisocyanates with higher functionalities, however, stiffer products can be produced.

Depending upon the precise characteristics desired for the final polyurethane matrix and coating, the relative proportions of the amine and the polyol reactants of the B component can be adjusted over a substantial range. The diamine component may range from about 5 wt.% to about 45 wt.% of the total reactants and may have hydroxyl numbers in the range from about 300 to about 1,600 for two-functional diamines and from about 300 to about 900 for quadrifunctional diamines. Similarly, the polyol constituents may also range from about 5 wt.% to about 45 wt.% of the reactants. To increase the flexibility of the urethane product, less of the diamine constituent is used relative to the polyol constitutent, the total of the two being sufficient for reaction with the isocyanate of the A component, the total A and B components preferably being approximately equal.

It has been found that cracked, aged, or partially crumbling concrete can be repaired and reinforced to greatly lengthen its service life by spraying it with a protective layer of the polyurethane elastomeric compositions of this invention. The urethane precursors are found to penetrate sufficiently before hardening as to form a sturdy network in the interstices of the damaged or fragmented components, such that upon curing and hardening, the composite structure is far stronger and more durable than before.

Because it is important to exclude the presence of any volatile materials, it has been found desirable, in some cases, to apply a thin flash coat of polyurethane to the concrete structure and allow it to cure for a few minutes to ensure that the surface is in a suitable condition for applying the final thicker coating or layer of polyurethane. The exothermic polymerization reaction has been found to be an excellent means of determining whether any residual moisture is present on the concrete surface. If such moisture is present, the flash coat will immediately form bubbles, due to the vaporized moisture. Such bubble formation dictates that no further urethane reactants be applied until the concrete substrate is in a drier condition. If no significant amount of bubbles form, the spraying can be continued until the desired thickness of urethane coating is obtained.

Many other uses and variations of the invention will be apparent to those skilled in the art, and while specific embodiments of this invention have been described, these are intended for illustrative purposes only. It is intended that the scope of the invention be limited only by the attached claims.

What is claimed is:

1. A method for repairing and enhancing the durability of a concrete conduit whose cement matrix has at least partially deteriorated and developed void interstices among the aggregate constituents comprising:
providing a substantially volatile-free A component containing an isocyanate urethane precursor,
providing a substantially volatile-free B component containing polyol and amine urethane precursors,
preheating said A component to a temperature in the range from about ambient temperature to about 140° F.,
preheating said B component to a temperature in the range from about 110° F. to about 150° F.,
mixing and spraying said A and B components onto the surface of said conduit,
filling said interstices adjacent said surface with said components,
reacting said A and B components to form a tough polyurethane matrix in said interstices and an exterior layer adhering to said surface in a very fast gel time ranging up to about 12 seconds.

2. The invention as recited in claim 1 wherein said polyols constitute from about 5 wt.% to about 45 wt.% of the total process reactants and have average molecular weights in the range from about 1,000 to about 6,000, said amines comprise N,N,N',N' tetrakis (2-hydroxypropyl) ethylenediamine having a hydroxyl number in the range from about 300 to about 900, said isocyanate comprises diphenylmethane 4,4, diisocyanate having a functionality in the range from about 2.0 to about 2.8, and said amine constitutes from about 5 wt.% to about 45 wt.% of the process reactants.

3. A method for repairing and enhancing the durability of a cementitious substrate whose cement matrix has at least partially deteriorated and developed void interstices therein comprising:
mixing a substantially volatile-free polyurethane A component precursor and a substantially volatile-free polyurethane B component precursor,
spraying said polyurethane precursors onto the surface of said cementitious substrate,
filling said interstices adjacent said surface with said precursors, and
reacting said A component and B component precursors to form a tough polyurethane matrix in said interstices and an exterior layer adhering to said surface in a very fast gel time ranging up to about twelve seconds.

* * * * *